United States Patent
Lee

(10) Patent No.: US 7,714,555 B2
(45) Date of Patent: May 11, 2010

(54) SWITCHING REGULATION DEVICE AND RELATED METHOD WITH OVER-CURRENT PROTECTION

(75) Inventor: Ming-Han Lee, Taipei Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 470 days.

(21) Appl. No.: 11/758,671

(22) Filed: Jun. 6, 2007

(65) Prior Publication Data

US 2007/0279028 A1   Dec. 6, 2007

(30) Foreign Application Priority Data

Jun. 6, 2006   (TW) .............................. 95120017 A

(51) Int. Cl.
*G05F 1/40* (2006.01)
(52) U.S. Cl. ..................................... 323/282
(58) Field of Classification Search ................ 323/282, 323/283, 284, 285, 351
See application file for complete search history.

(56) References Cited

U.S. PATENT DOCUMENTS

| | | | |
|---|---|---|---|
| 5,694,029 A | 12/1997 | Hayes et al. | |
| 6,215,364 B1 | 4/2001 | Hwang | |
| 6,246,220 B1 * | 6/2001 | Isham et al. | 323/224 |
| 6,430,070 B1 | 8/2002 | Shi | |
| 6,922,040 B2 * | 7/2005 | Ando et al. | 323/224 |
| 7,012,411 B2 | 3/2006 | Yasukouchi | |
| 7,030,596 B1 * | 4/2006 | Salerno et al. | 323/282 |
| 7,109,692 B1 * | 9/2006 | Wu et al. | 323/282 |
| 7,109,693 B2 * | 9/2006 | Yoshida et al. | 323/282 |
| 7,378,822 B2 * | 5/2008 | Liao | 323/222 |
| 2004/0169979 A1 * | 9/2004 | Pai | 361/93.1 |

FOREIGN PATENT DOCUMENTS

| | | |
|---|---|---|
| TW | 419899 | 1/2001 |
| TW | 453022 | 9/2001 |
| TW | 560125 | 11/2003 |
| TW | 588489 | 5/2004 |
| TW | 200531417 | 9/2005 |

\* cited by examiner

*Primary Examiner*—Adolf Berhane
(74) *Attorney, Agent, or Firm*—Winston Hsu

(57) ABSTRACT

A switching regulation device includes a switching regulation module and a control module. The switching regulation module generates a first control signal. The control module is coupled to the switching regulation module for receiving the first control signal and performing an over-current protection on the switching regulation module according to a current ratio.

18 Claims, 2 Drawing Sheets

SWITCHING REGULATION DEVICE AND RELATED METHOD WITH OVER-CURRENT PROTECTION

BACKGROUND OF THE INVENTION

1. Field of the Invention

The present invention relates to a switching regulation device and related method with over-current protection, and more particularly, to a switching regulation device and related method utilizing two charge pumps for charging/discharging a capacitor to achieve an object of over-current protection.

2. Description of the Prior Art

Regulators usually include switching regulators and liner regulators. Liner regulators are inexpensive and easily applicable, but with poor efficiency consuming up to 50% of the power. The switching regulators maintain the output voltage at a predetermined value by a method of switching currents. The power efficiency of the switching regulators is acceptable, but the problem of high-frequency noise exists.

SUMMARY OF THE INVENTION

One objective of the claimed invention is to provide a switching regulation device with over-current protection. The switching regulation device includes a switching regulation module and a control module. The switching regulation module is used for generating a first control signal. The control module is coupled to the switching regulation module, for receiving the first control signal and for performing an over-current protection on the switching regulation module according to a current ratio.

One objective of the claimed invention provides a method for switching voltage. The method includes comparing a voltage level with an output voltage to generate a first comparison signal, comparing the first comparison signal with a periodic signal to generate a first control signal, generating a control signal according to the first comparison signal, and charging/discharging a capacitor according to the control signal and a current ratio.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
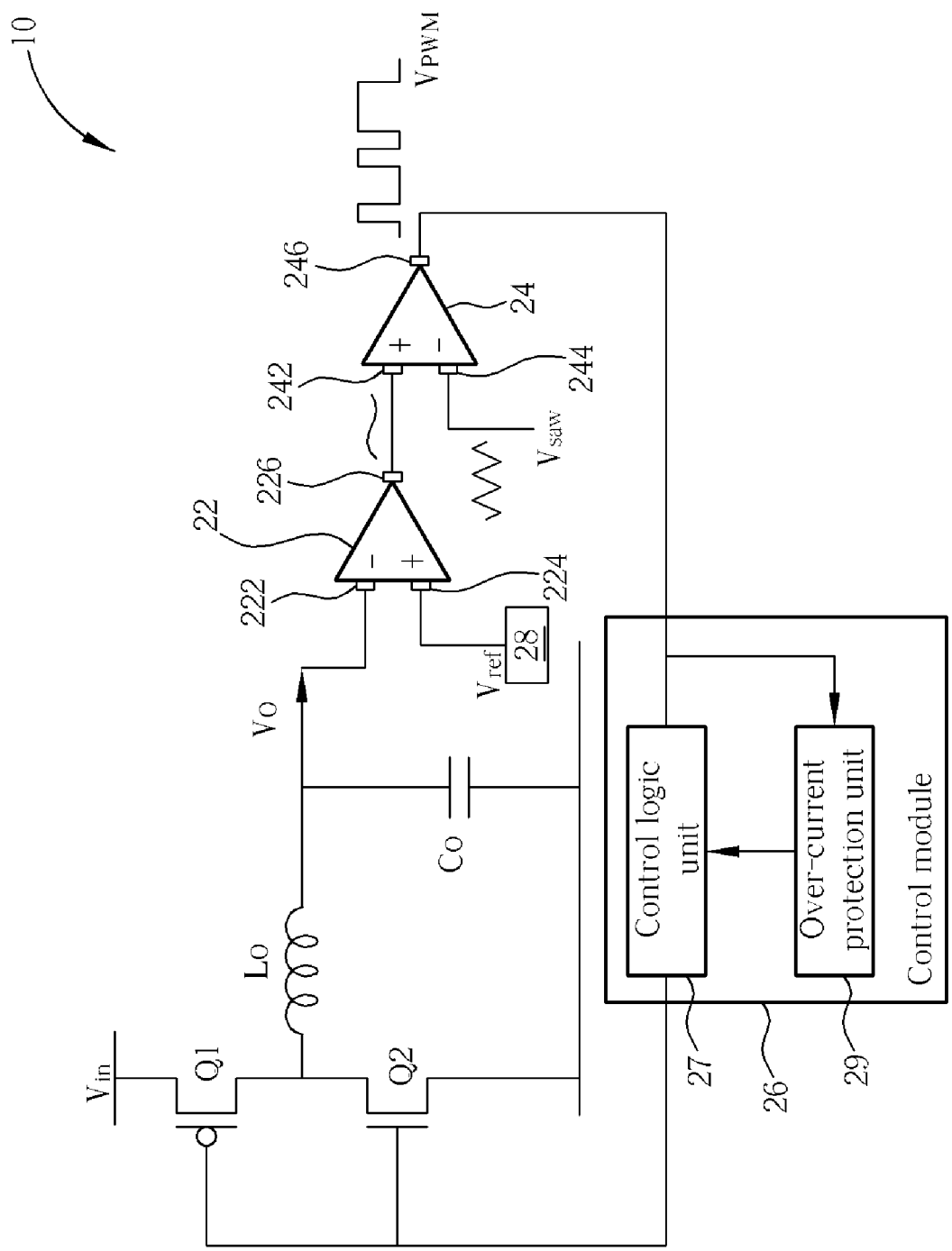
FIG. 1 is a diagram of a switching regulation device according to an embodiment of the present invention.

Please refer to FIG. 1. FIG. 1 illustrates a diagram of a switching regulation device 10 according to an embodiment of the present invention. The switching regulation device 10 includes a first switch Q1, a second switch Q2, an output inductance Lo, an output capacitor Co, an error amplifier 22, a comparator 24, and a control module 26. The control module 26 includes a control logic unit 27 and an over-current protection unit 29. The second switch Q2 is coupled to the first switch Q1. The output capacitance Co is coupled to the first switch Q1 and to the second switch Q2. The control module 26 is used for controlling the first switch Q1 and the second switch Q2 to turn on or to turn off The error amplifier 22 includes a first input end 222 coupled to the output inductance Lo and to the output capacitor Co for receiving an output voltage Vo, and a second input end 224 for receiving a reference voltage Vref. The error amplifier 22 is used for generating an error signal according to signals received at these two input ends 222 and 224. The comparator 24 includes a first input end 242 coupled to an output end 226 of the error amplifier 22 and a second input end 244 for receiving a sawtooth-wave signal Vsaw. An input end of the control module 26 is coupled to an output end 246 of the comparator 24 for receiving a pulse width modulation signal VPWM, and an output end of the control module 26 is coupled to a control end of the first switch Q1 and to a control end of the second switch Q2 for controlling the first switch Q1 and the second switch Q2 to turn on or to turn off. When the first switch Q1 is turned on, an input voltage Yin charges the output inductance Lo and the output capacitor Co. When the first switch Q1 is turned off and the second switch Q2 is turned on, an output voltage Vo discharges the output inductance Lo and the output capacitor Co. The first switch Q1 and the second switch Q2 can each be a metal-oxide semiconductor field effect transistor (MOSFET), whereof the first switch Q1 is a P-type MOSFET and the second switch Q2 is an N-type MOSFET. The switching regulator 10 further includes a reference voltage generator 28 coupled to the second input end 224 of the error amplifier 22 for generating the reference voltage Vref. The duty-cycle of the pulse width modulation signal VPWM is directly proportional to the provided current, meaning that the longer the duty-cycle, the larger the provided current is. Please note that the control module 26 includes the control logic unit 27 and the over-current protection unit 29. The control logic unit 27 is a logic element of the control module 26 for controlling turning on or turning off the first switch Q1 and the second switch Q2. The over-current protection unit 29 is the auxiliary circuit of the control logic unit 27 for detecting the situation of the current load. Hence, the control logic unit 27 determines whether to turn on or to turn off the first switch Q1 and the second switch Q2 according to the situation of the current load detected by the over-current protection unit 29.

Figure 2:
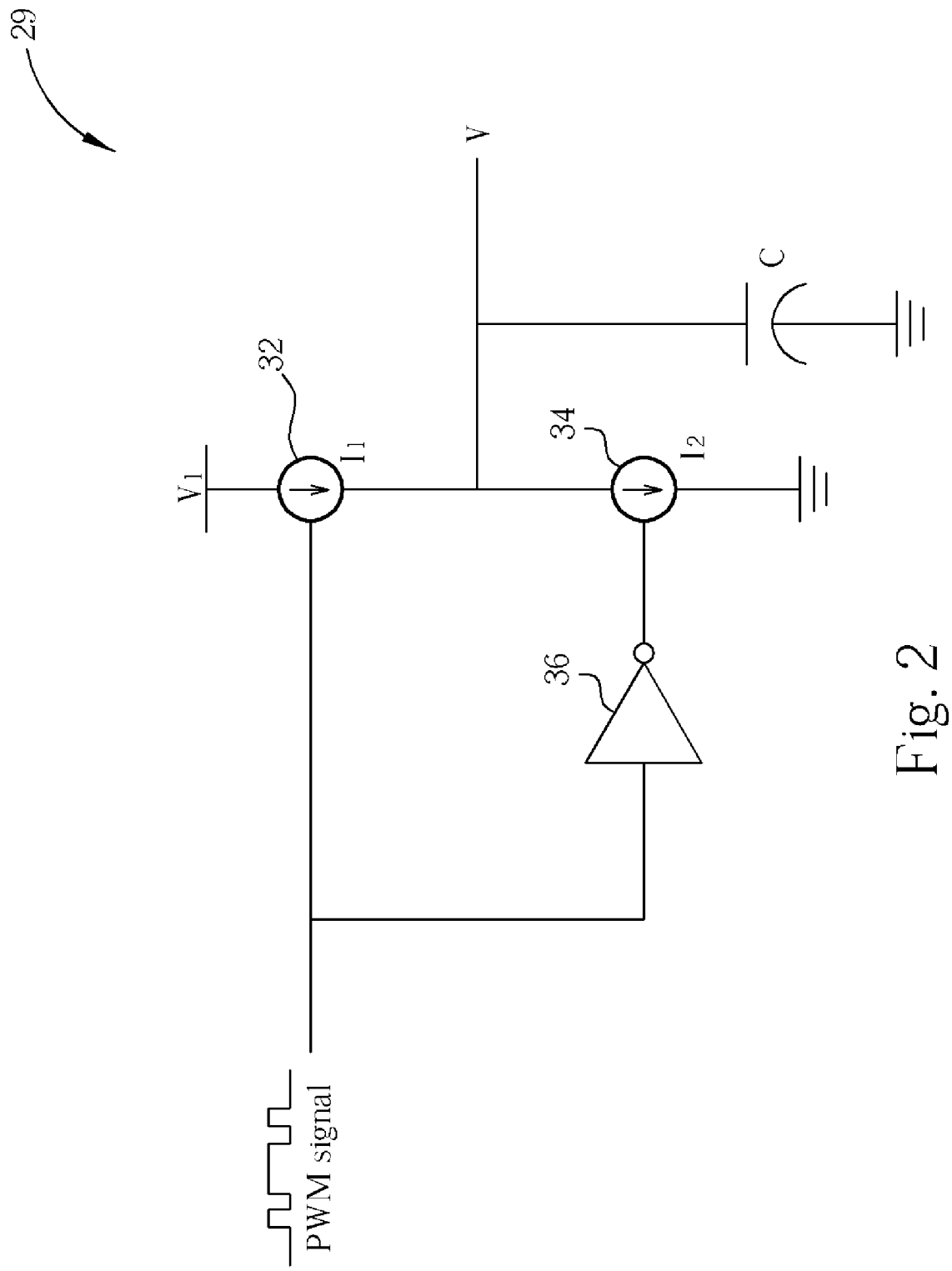
FIG. 2 is a diagram showing the over-current protection unit in FIG. 1.

Please refer to FIG. 2. FIG. 2 illustrates a diagram showing the over-current unit 29 in FIG. 1. The over-current unit 29 includes a capacitor C, a first charge pump 32, a second charge pump 34, and an inverter 36. A control end of the first charge pump 32 is used for receiving a pulse width modulation signal (coupled to the output end 246 of the comparator 24, referring to FIG. 1), and an output end of the first charge pump 32 is coupled to the capacitor C. The first charge pump 32 is used for generating a first current $I_1$ to charge the capacitor C. The inverter 36 is coupled to a control end of the second charge pump 34 for performing an inverse operation on the pulse width modulation signal. The control end of the second charge pump 34 is coupled to an output end of the inverter 36 for receiving the pulse width modulation signal after the inverse operation, and the output end of the second charge pump 34 is coupled to the capacitor C and to the first charge pump 32. The second charge pump 34 is used for generating a second current $I_2$ to discharge the capacitor C. The voltage V is the voltage crossing the capacitor C, an input end of the first charge pump 32 is coupled to a voltage source $V_1$, and an input end of the second charge pump 34 is coupled to the ground.

Referring to FIG. 2, the capacitor C is charged and discharged according to the pulse width modulation signal. When the pulse width modulation signal is at a high voltage level, the capacitor C is charged. And when the pulse width modulation signal is at a low voltage level, the capacitor C is discharged. Assume that the second current $I_2$ is four times of the first current $I_1$, which corresponds to a pulse width modulation signal with a duty-cycle of 80%, and 80% is also the upper limit of the duty-cycle. The upper limit of the duty-cycle can be adjusted by changing the current ratio. If the duty-cycle exceeds 80%, the security range of this circuit is exceeded and the over-current protection unit 29 will increase the crossing voltage V on the capacitor. When the crossing voltage V on the capacitor exceeds a predetermined reference voltage, the over-current protection unit 29 will control the control logic unit 27 to stop providing the current under the over-current protection.

The above-mentioned embodiments illustrated are not limited to the present invention. The mentioned second current $I_2$ is four times of the first current $I_1$, but the scope of the present invention is not restricted to the embodiment. The ratio of the second current $I_2$ and the first current $I_1$ can be adjusted according to requirements. Furthermore, the upper limit of the duty-cycle can be adjusted by changing the current ratio.

In conclusion, the present invention provides a switching regulation device with over-current protection. The capacitor C is charged or discharged by utilizing the first charge pump 32 and the second charge pump 34. First of all, the ratio between the second current $I_2$ and the first current $I_1$ is set. When the duty-cycle exceeds the upper limit of the duty-cycle in original designs, the security range of the switching regulation device is exceeded. The upper limit of the duty-cycle can be adjusted by changing the current ratio between the second current $I_2$ and the first current $I_1$. The method is applicable in a system capable of adjusting its output voltage. Furthermore, extra passive elements are no longer needed to measure the output current, and more cost is thus saved. In addition, the power is no longer consumed by external resistors, and therefore the power efficiency is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A switching regulation device with over-current protection comprising:
   a switching regulation module used for generating a first control signal; and
   a control module, coupled to the switching regulation module, for receiving the first control signal and for performing an over-current protection on the switching regulation module according to the first control signal and a current ratio, wherein the current ratio is a ratio between a charging current and a discharging current.

2. The switching regulation device of claim 1, wherein the switching regulation module comprises:
   a first switch;
   a second switch coupled to the first switch;
   an output inductance coupled to the first switch and to the second switch;
   an output capacitor coupled to the output inductance;
   a first comparator, for receiving an output voltage and a reference voltage to generate an error signal according to the output voltage and the reference voltage; and
   a second comparator coupled to an output end of the first comparator for generating the first control signal.

3. The switching regulation device of claim 2, wherein the control module is coupled to the second comparator, and the control module comprises a control logic unit and an over-current protection unit.

4. The switching regulation device of claim 3, wherein the control module controls the first switch and the second switch.

5. The switching regulation device of claim 3, wherein the over-current protection unit comprises:
   a capacitor coupled to the first switch and to the second switch;
   a first charge pump, for generating a first current as the charging current to charge the capacitor; and
   a second charge pump used for generating a second current as the discharging current to discharge the capacitor.

6. The switching regulation device of claim 5 further comprising an inverter coupled to the second charge pump.

7. The switching regulation device of claim 5, wherein the first charge pump is coupled to a voltage source.

8. The switching regulation device of claim 5, wherein the second charge pump is coupled to ground.

9. The switching regulation device of claim 2, wherein the first switch and the second switch are metal-oxide semiconductor field effect transistors (MOSFET).

10. The switching regulation device of claim 2, wherein the first switch is a P-type MOSFET and the second switch is an N-type MOSFET.

11. The switching regulation device of claim 2 further comprising a reference voltage generator for generating the reference voltage.

12. The switching regulation device of claim 1, wherein the first control signal is a pulse width modulation (PWM) signal.

13. The switching regulation device of claim 1, wherein the current ratio of the control module is used for controlling a duty cycle of the first control signal.

14. A method for switching voltage comprising:
   comparing a voltage level with an output voltage to generate a first comparison signal;
   comparing the first comparison signal with a periodic signal to generate a first control signal; and
   performing an over-current protection by charging and discharging a capacitor according to the first control signal and a current ratio, wherein the current ratio is a ratio between a charging current and a discharging current.

15. The method of claim 14, wherein the first control signal is a pulse width modulation signal.

16. The method of claim 14, wherein the step of charging and discharging the capacitor according to the first control signal and the current ratio comprises:
   charging the capacitor according to a first predetermined current; and
   discharging the capacitor according to a second predetermined current.

17. The method of claim 16, wherein the first predetermined current is used as the charging current, and the second predetermined current is used as the discharging current.

18. The method of claim 14 further comprising performing an inverse operation on the first control signal.

* * * * *